Sept. 5, 1939.  C. V. KRICHTON  2,171,878
TEMPERATURE CONTROL SYSTEM
Filed May 20, 1938   2 Sheets-Sheet 1
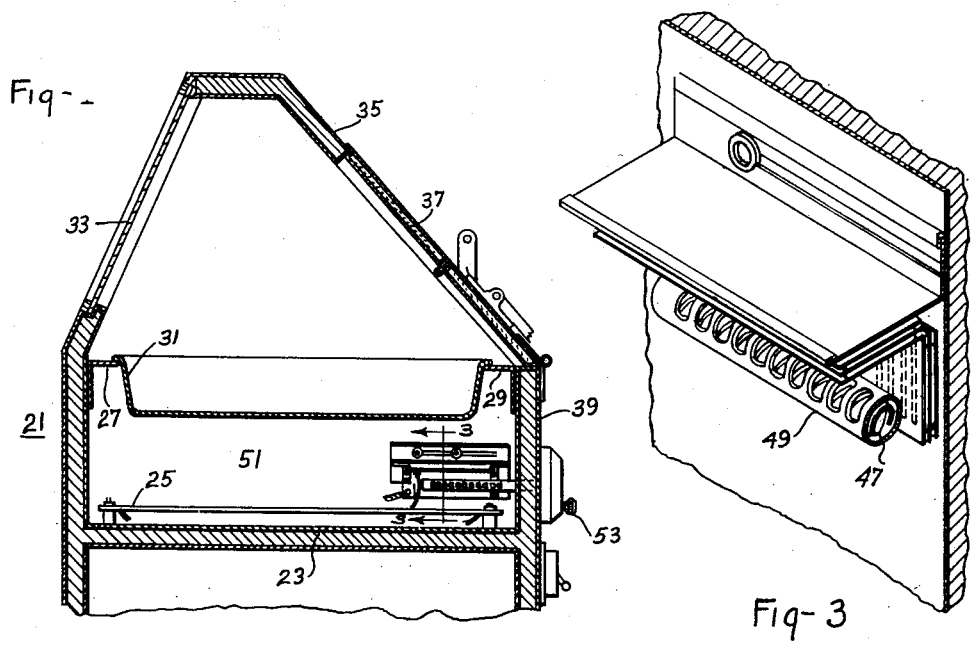
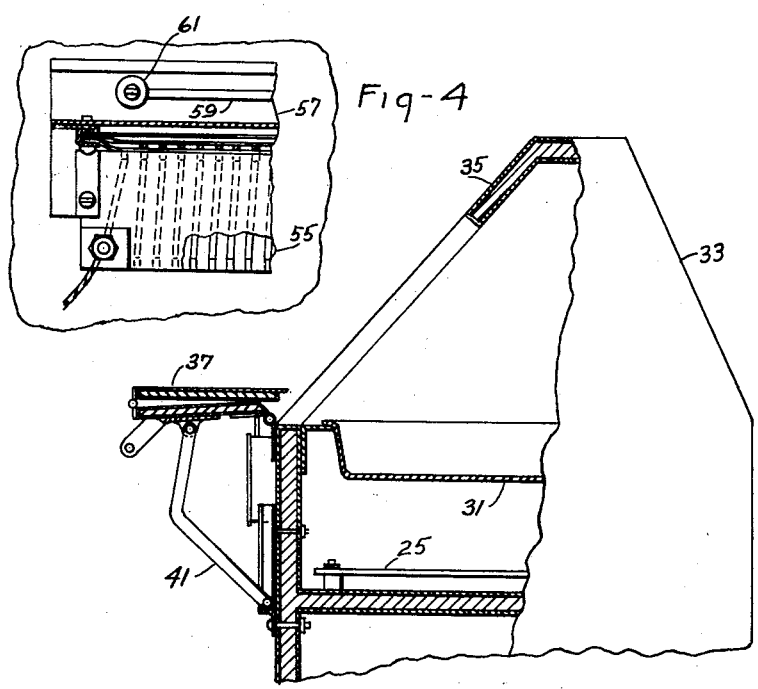
Inventor
Carl V. Krichton
By H. M. Biebel
Attorney Sept. 5, 1939.   C. V. KRICHTON   2,171,878
TEMPERATURE CONTROL SYSTEM
Filed May 20, 1938   2 Sheets-Sheet 2
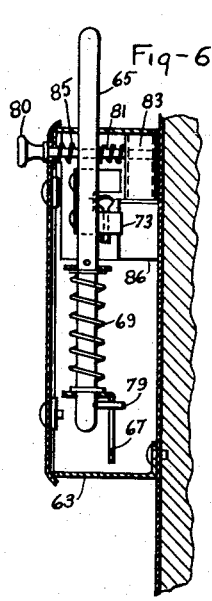
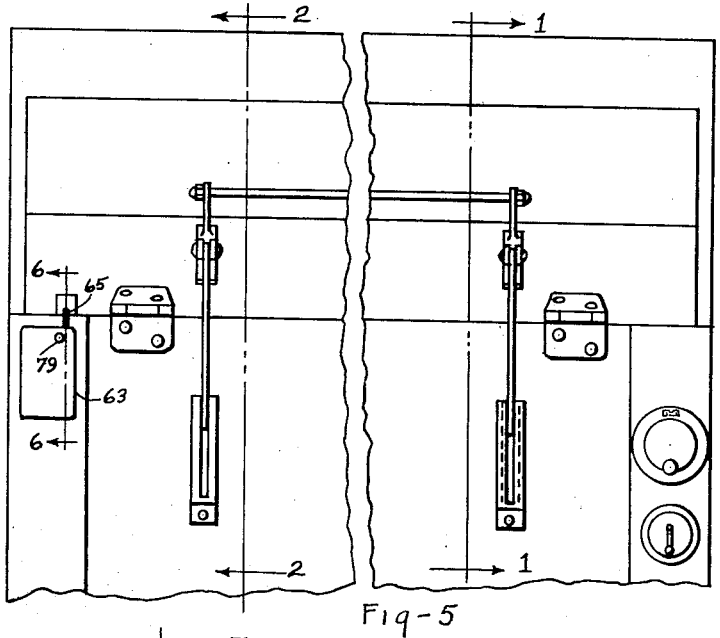
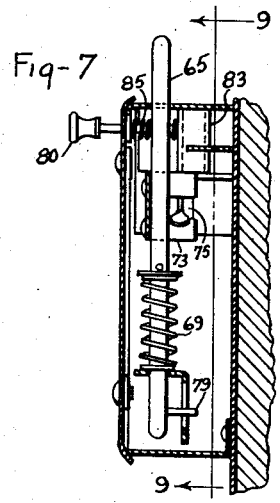
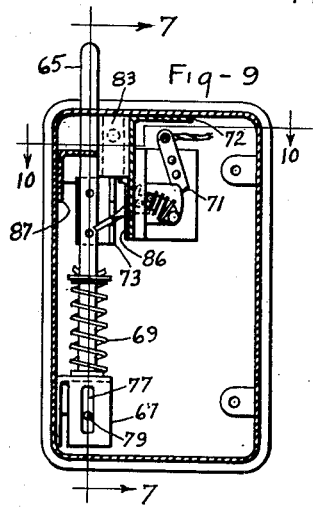
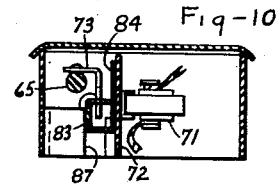
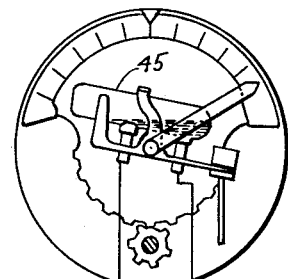
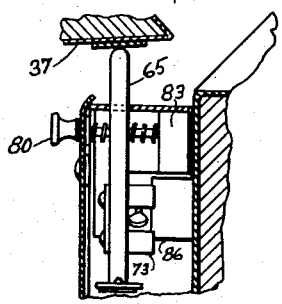
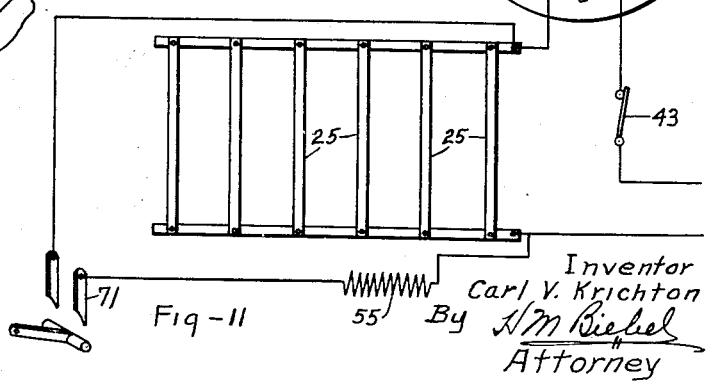
Inventor
Carl V. Krichton
By H. M. Biebel
Attorney Patented Sept. 5, 1939

2,171,878

UNITED STATES PATENT OFFICE 2,171,878

TEMPERATURE CONTROL SYSTEM

Carl V. Krichton, Elgin, Ill., assignor to McGraw Electric Company, Chicago, Ill., a corporation of Delaware Application May 20, 1938, Serial No. 209,001

6 Claims. (Cl. 219—20)

My invention relates to food storage and serving devices and particularly to temperature control systems for such devices.

An object of my invention is to provide a relatively simple temperature control system for a hot food serving appliance that shall be effective to maintain a substantially constant temperature in the food chamber under all conditions of operation.

Another object of my invention is to provide a door-controlled switch means for insuring that a greater amount of heat will be generated in a food storing and serving chamber when the door thereof is open than when it is closed.

Another object of my invention is to provide a temperature control system for use with a hot food storing and serving compartment that shall permit of quick heating up of the compartment from a cold condition.

Other objects of my invention will either be apparent from a description of that embodiment of my invention now preferred by me or will be set forth in such description and in the appended claims. While I have illustrated and described a single embodiment only of my invention, I do not desire to be limited thereto but intend that the scope of the appended claims shall be limited only by the pertinent prior art and that these claims shall cover obvious modifications coming within their scope.

In the drawings,

Fig. 1 is a vertical sectional view of a hot food storing and serving appliance with which is associated the device and system embodying my invention, this view being taken on the line 1—1 of Fig. 5.

Fig. 2 is a vertical sectional view thereof taken on the line 2—2 of Fig. 5.

Fig. 3 is an enlarged fragmentary perspective view of an auxiliary heater constituting a part of my system, this view being taken on the line 3—3 of Fig. 1, Fig. 4 is an enlarged fragmentary sectional view of the auxiliary heater shown in Fig. 3, as seen in Fig. 1, Fig. 5 is a partial front elevational view of the device shown in Fig. 1, Fig. 6 is a vertical sectional view of an auxiliary heater control switch taken on the line 6—6 of Fig. 5 and in normal position, with the electric switch contacts closed.

Fig. 7 is a view similar to Fig. 6, taken on the line 7—7 of Fig. 9, showing the switch contacts open and the push rod held by a push or release button stop.

Fig. 8 is a fragmentary view of the auxiliary switch showing the button release stop in normal position, the switch rod being held in the position shown by the weight of the door, Fig. 9 is a vertical sectional view of the switch on the line 9—9 of Fig. 7, Fig. 10 is a top plane sectional view thereof taken on the line 10—10 of Fig. 9, and Fig. 11 is a schematic wiring diagram showing the electric circuit closed through the main heaters of the system, the auxiliary heater circuit being open.

In the operation of hot food storing and serving cabinets it is of course necessary that the food be not only stored for a time after being placed in the cabinet, during which time the door or doors can remain closed, but it is also necessary that these foods be maintained at substantially the same temperature while serving from the cabinet is being done which of course makes it necessary to more or less continuously open the door or to keep it open for protracted periods of time, especially during the rush time.

In addition to this it is also highly desirable to be able to effect quick heating up of the food storing compartment or cabinet especially after a device of this kind has been out of use, as over night or over a weekend.

Certain parts of the cabinet which have been illustrated and which will be described are already old and well known in the art but they will be described only with reference to the temperature system and the parts thereof more particularly embodying my invention.

A cabinet 21 designed with particular reference to the storing and serving of hot food in restaurants and other public dining rooms is shown partially only in Figs. 1, 2 and 5 and, as there shown, embodies a plurality of inner and outer walls separated by suitable heat insulating material, particularly at the lower portions thereof. An intermediate wall 23 is shown as extending horizontally of the cabinet and as being arranged to support a plurality of electric heating elements 25, any desired number of which may be provided. While I have shown these heating elements 25 as being of a particular type and as being supported by the intermediate wall 23, I do not desire to be limited thereto although at present I prefer such location of the heating elements.

A plurality of brackets 27 and 29 may be provided above the intermediate wall 23 and the heating elements 25, on which may be placed food containers 31 here shown as relatively deep pans. It is to be understood of course that any desired food container or containers may be used.

The upper portion of the cabinet 21 includes an upwardly and angularly inclined front wall 33 which may include a pane of glass, this pane of glass being that through which the purchaser or patron may view the different foods on display.

An inner or rear wall 35 is also provided and extends angularly upwardly and has a suitable two-part door 37 hingedly secured to the upper end of the inner vertical wall 39. The open position of door 37 is shown particularly in Fig. 2 of the drawings. A stop means or support 41 (see Fig. 2) is provided to limit the opening movement of the door 37.

As has already been hereinbefore stated the above described details of the food storing and serving cabinet have already been in use for some time and the right is reserved to apply the device and system embodying my invention to other forms of appliances with which it may be operatively associated.

Referring now to Fig. 11 of the drawings I have there shown a diagram of electric circuit connections and it will be noted from this figure of the drawings that the plurality of electric heating elements 25 are controlled as to their energization by a manually actuable switch 43 and a thermally controlled switch 45 which latter switch may be of any suitable kind and which I now purchase in the open market. As here shown the mercury switch 45 is pivotally mounted and is adapted to be turned by a spiral 47 of bimetal, which bimetal spiral may be protected by a laterally perforated tube 49. This bimetal spiral 47 and its protecting tube 49 are normally positioned within a heating chamber 51 extending between the food containers 31 and the intermediate wall 23. A manual adjusting knob 53 is provided whereby the temperature at which deenergization of the main heating elements 25 by the mercury switch 45 may be varied as desired.

It is obvious that a temperature control system of this general kind can be adjusted to meet the requirement of being able to maintain the temperature of the food container, or of the chamber 51 below the food container or containers while the door 37 remains closed, or that it can be adjusted to maintain the foods at a desired temperature when the door is continuously open but that some means is necessary to enable the food to be maintained at substantially the same temperature irrespective of whether the door is open or is closed or is intermittently and alternately opened and closed.

It is further obvious that it is necessary to generate either a greater amount of heat or the same amount of heat for a greater proportion of the total time when the door is intermittently opened and closed or if the door remains open than must be provided when the door remains closed.

In order to automatically affect the temperature responsive element 47 so that it will maintain the main control switch 45 in closed position for greater lengths of time with the door open I provide an auxiliary heater 55 of much lower wattage than the main heaters. As shown in the several figures of the drawings a heating resistor is wound on sheets of thin electric-insulating material such as mica, and the heater is adjustably secured by a supporting bracket 57 which bracket 57 may be moved longitudinally of the bimetal spiral 47, such movement being permitted by a slot 59 in bracket 57 through which a screw 61 extends into a wall of compartment 51. While I have shown a particular embodiment of auxiliary heater, I do not desire to be limited thereto as any equivalent heater structure may be used.

It is obvious that bimetal spiral 47 will be subjected to heat from the main heating elements 25 and more particularly by the heated air in compartment 51, this being of course true when auxiliary heater 55 is deenergized. When, however, auxiliary heater 55 is energized bimetal spiral 47 is subjected to a small amount of additional heat radiated against the bimetal spiral by auxiliary heater 55 so that the temperature of the thermally actuable element will be increased. Since a thermally actuable element will operate at a definite temperature, irrespective of how that temperature is caused, it is obvious that when the auxiliary heating element 55 is energized to provide an additional source of heat, the temperature of the air in the chamber 51 need not be as high as it would have to be otherwise to cause the thermally actuable element 47 to move switch 45 to its deenergizing position.

Door controlled means for energizing and deenergizing the auxiliary heater 55 includes a casing 63 secured against the front outer wall of the device 21 as shown more particularly in Fig. 5 of the drawings. A push rod 65 is movably mounted within casing 63 and extends thereabove as shown in Figs. 6, 7, 8 and 9. It may be guided by the upper wall of the casing and by a bracket 67 in the lower portion of the casing 63, which bracket has a flange portion secured to a side wall of the casing, and a biasing spring 69 tends to maintain the push rod 65 in its upper position as shown in Fig. 6 of the drawings. A control switch 71, which is here shown as of the toggle type, is suitably secured on a bracket 72 (see Fig. 9) in the casing 63 and is electrically connected in series circuit relation with the auxiliary heater 55. A bracket 73 having a notch 75 therein is secured to push rod 65 and loosely engages the actuating handle of switch 71. It may be here pointed out that when push rod 65 is in its upper position as shown in Fig. 6 of the drawings that switch 71 will be in its closed position, while when push rod 65 is in its lowermost position, switch 71 will be in its open position, as shown in Fig. 9 of the drawings. Bracket 67 has a vertical slot 77 therein in which a stop pin 79 extending laterally of push rod 65 may move to limit both upward and downward movement of the push rod 65.

It will be noted that when door 37 is in its closed position as shown for instance in Fig. 5 of the drawings, push rod 65 will occupy its upper position because of the action of spring 69 thereon, while when the door 37 is opened, as shown in Fig. 2 of the drawings, push rod 65 is forced downwardly by the door, the relative positions of a part of door 37 and of push rod 65 being shown particularly in Fig. 8 of the drawings. It is thus apparent that switch 71 will be in its closed position as long as the door 37 is closed, the closed position of switch 71 resulting in energization of the auxiliary heater 55 whereby this auxiliary heater is effective to radiate a small amount of heat to the thermally actuable element 47 so that the main electric heaters 25 need not be energized as long in order to maintain the food in containers 31 at the desired temperature. If however the door is opened, which action would cause an increase of heat loss from the food and from the interior of the cabinet, switch 71 is automatically thereby moved in the manner above set forth, to its open position whereby auxiliary heater 55 is deenergized and thermally actuable element 47 will be effective to maintain switch 45 in closed position for a greater proportion of the total time than it did while the door was closed.

It may be desirable from time to time, particularly on putting the cabinet 21 into use in the morning, to be able to cause a quick heating up of the cabinet and this may be effected in the following manner. The operator will push down manually on push rod 65 to move it to its lowermost position, substantially that shown in Fig. 9 of the drawings, and then pull out on a knob 80 extending in substantially horizontal direction from the front of the casing 63. This knob 80 is mounted on the front end of a rod 81 extending into a friction stop member 83, which may be of substantially hollow box shape with a guide flange 84, a spring 85 around rod 81 tending to hold member 83 in the position shown in Fig. 6 of the drawings. In this position member 83 will be out of the path of travel of bracket 73 on push rod 65. Member 83 is supported by a bracket 86 secured to bracket 72. An angle bracket 87 secured to a side wall of the casing 63 prevents lateral movement of member 83 away from bracket 72 and assists the latter in guiding 83.

When the operator manually pushes down on rod 65, the upper edge of bracket 73 will be moved just below the lower edge of locking member 83 and if the operator now pulls outwardly on knob 80 member 83 will be moved against the pressure of spring 85 over the upper edge of bracket 73, as shown in Fig. 7 of the drawings. The upward pressure of spring 69 on rod 65 and thereby on bracket 73 will cause a pressure friction between the upper edge of bracket 73 and the lower edge of locking member 83 whereby member 83 will be held in locking position (as shown in Fig. 7) against the pressure of spring 85.

It is possible to raise the temperature of the compartment 51 as well as of the upper part of the cabinet to a relatively higher value within a relatively shorter time with the auxiliary heater 55 deenergized than would be the case if heater 55 were energized, since the general effect of such an auxiliary heater is to slow up the attainment of the desired operating temperature.

It is obvious that this quick heating up operation can be effected either without food in the cabinet or after food has been placed in the initially cold cabinet. If the operator should wish to reduce the temperature within the closed cabinet, as by causing energization of auxiliary 55, this can easily be done by momentary downward pressure on push rod 65 which will permit movement of locking member 83 from the position shown in Fig. 7 to that shown in Fig. 6, with the result that push rod 65 in its upward movement causes closing of switch 71.

It is further obvious that if door 37 is opened either to put food into the compartment or to serve food already in the compartment, the door 37 will then, so to speak, take over the control of the auxiliary switch by its action on push rod 65 as has already been hereinbefore set forth.

The system embodying my invention therefore provides an automatic control means effective to increase the amount of heat or to increase the length of time during which heat is provided in a food storing and food serving compartment to compensate for or to counteract the greater loss of heat when the serving door of such a compartment is opened or is open.

It is further obvious that an operator may similarly control the operation of the temperature control system if desired and may also cause quick temperature rise in the cabinet itself upon starting up operation thereof.

I claim as my invention:

1. Means for maintaining a substantially constant temperature in a food storage chamber defined by a plurality of walls and a door, said means including a main heating element, a switch for controlling said element, a thermostat subject to chamber temperature for controlling said switch, an auxiliary heating element in heat-transmitting relation to said thermostat and means actuated by the door to cause deenergization of the auxiliary heating element when the door is open.

2. A temperature control means for a food storage chamber defined by a plurality of walls and a door, said means including a main electric heating element, a thermally controlled switch for the heating element responsive to chamber temperature, an auxiliary electric heater in heat transmitting relation to the thermally responsive element of said switch and a door-controlled switch for the auxiliary electric heater normally biased to a position wherein it causes energization of the auxiliary electric heater and located relatively to said door to be moved thereby to a position for deenergizing said auxiliary electric heater when said door is moved into open position.

3. A temperature control means as set forth in claim 2 in which the door-controlled switch is manually actuable to deenergizing position and includes means for holding it in such position.

4. A temperature control means as set forth in claim 2 in which the door-controlled switch is manually actuable to its deenergizing position and includes manually releasable means for holding it in such position.

5. A temperature control means for a food storage chamber defined by a plurality of walls and a door, said means including a main heating means for said chamber, a switch for said heating means, a thermostat subject to chamber temperature for controlling said switch, an auxiliary heating means in heat transmitting relation to said thermostat and a door-actuated switch means for controlling said auxiliary heating means to cause an increase in the amount of heat generated by the main heating means when said door is open.

6. Means for maintaining a substantially constant temperature in a hot food storage chamber defined by a plurality of walls and a door, said means including an electric heating element, a thermally-actuable switch subject to chamber temperature controlling the energization of said heating element and door controlled means affecting said thermally actuable switch to cause an increase in the amount of heat generated by said electric heating element when the door is opened.

CARL V. KRICHTON.